United States Patent [19]
Koike

[11] Patent Number: 5,893,430
[45] Date of Patent: Apr. 13, 1999

[54] STEERING APPARATUS FOR AUTOMOTIVE VEHICLE

[75] Inventor: Shin Koike, Aichi-ken, Japan

[73] Assignee: Toyota Jidosha Kabushiki Kaisha, Toyota, Japan

[21] Appl. No.: 08/791,470

[22] Filed: Jan. 27, 1997

[30] Foreign Application Priority Data

Feb. 1, 1996 [JP] Japan ................................. 8-016783

[51] Int. Cl.$^6$ ................................................. B62D 5/22
[52] U.S. Cl. ............................................ 180/443; 180/426
[58] Field of Search ..................................... 180/404, 406, 180/407, 443, 444, 426, 427

[56] References Cited

U.S. PATENT DOCUMENTS

| | | | |
|---|---|---|---|
| 4,660,671 | 4/1987 | Behr et al. | 180/446 |
| 4,956,590 | 9/1990 | Phillips | 180/446 |
| 5,265,019 | 11/1993 | Harara et al. | 180/422 |
| 5,698,956 | 12/1997 | Nishino et al. | 180/443 |

FOREIGN PATENT DOCUMENTS

A-6-206553  7/1994  Japan .

*Primary Examiner*—Robert J. Oberleitner
*Attorney, Agent, or Firm*—Oliff & Berridge, PLC

[57] ABSTRACT

A steering apparatus for an automotive vehicle having a steering shaft connected at one end thereof with a steering gear and provided at the other end thereof with a steering wheel to be rotated by steering effort applied thereto and a planetary gear set assembled with the steering shaft. The planetary gear set is composed of a sun gear mounted on the steering shaft for rotation therewith, a ring gear rotatably mounted on the steering shaft in surrounding relationship with the sun gear to be rotated by an electric motor assembled therewith, a carrier rotatably mounted on the steering shaft to be retained in place by a reaction mechanism assembled therewith, and a set of planetary gears supported by the carrier and meshed with the sun gear and ring gear to transmit an input torque applied from the electric motor to the sun gear. The electric motor is arranged to apply the input torque to the ring gear when it is activated to effect automatic steering operation of the vehicle and to act as a reaction element of the ring gear when it is deactivated to effect manual operation of the steering wheel, while the reaction mechanism is arranged to permit free rotation of the carrier in a condition where the electric motor is deactivated and to fixedly retain the carrier in place in a condition where the electric motor is activated.

10 Claims, 3 Drawing Sheets

STEERING APPARATUS FOR AUTOMOTIVE VEHICLE

BACKGROUND OF THE INVENTION

1. Field of the Invention

The present invention relates to a steering apparatus for an automotive vehicle capable of effecting normal steerage of the vehicle caused by manual operation of a steering wheel and of effecting automatic steerage of the vehicle for assist of the normal steerage.

2. Description of the Prior Art

Disclosed in Japanese Patent Laid-open Publication No. 6(1994)-206553 is a steering apparatus of this kind which includes an input shaft provided thereon with a steering wheel to be rotated by steering effort applied thereto and to be rotated by a first electric motor with an electromagnetic clutch and a steering shaft connected at one end thereof with the input shaft by means of a planetary gear set and at the other end thereof with a steering gear. The planetary gear set is composed of a sun gear mounted on the input shaft for rotation therewith, a carrier connected to the one end of the steering shafts a ring gear arranged in surrounding relationship with the sun gear to be rotated by a second electric motor and a set of planetary gears supported by the carrier and meshed with the sun gear and ring gear. The electromagnetic clutch of the first electric motor acts to apply a reaction force to the input shaft when disengaged in manual operation of the steering wheel and to retain the input shaft in place when engaged in automatic operation of the steering shaft. The second electric motor acts as a reaction element of the ring gear in manual operation of the steering wheel and acts as a torque input element of the ring gear in automatic operation of the steering shaft.

In the steering apparatus described above, the ring gear of the planetary gear set is rotated by activation of the second electric motor for automatic operation of the steering shaft in a condition where the electromagnetic clutch of the first electric motor is engaged to retain the input shaft in place. If the control system of the second electric motor fails to activate the second electric motor during automatic operation of the steering shaft, there will occur a difference in rotation phase between the steering wheel and the steering shaft. As a result, the steered position of the steering shaft may not be recognized by the driver when the electromagnetic clutch of the first electric motor is disengaged to permit rotation of the input shaft.

Since in the steering apparatus, the electromagnetic clutch of the first electric motor is adapted to apply a reaction force to the input shaft in manual operation of the steering wheel, the control system of the first electric motor becomes complicated in construction to ensure high reliability of the steering apparatus. Since in the steering apparatus, the input shaft is separated from the steering shaft and is operatively connected to the steering shaft by means of the planetary gear set, the steering wheel may not be applied with a reaction force from road surfaces in its manual operation. This deteriorates the steering feel of the driver.

SUMMARY OF THE INVENTION

It is, therefore, a primary object of the present invention to provide a steering apparatus for an automotive vehicle capable of effecting normal steerage of the vehicle caused manual operation of a steering wheel and of effecting automatic steerage of the vehicle without causing the problems discussed above.

According to the present invention, there is provided a steering apparatus for an automotive vehicle having a steering shaft connected at one end thereof with a steering gear and provided at the other end thereof with a steering wheel to be rotated by steering effort applied thereto and a planetary gear set assembled with the steering shaft, wherein the planetary gear set comprises an output element mounted on the steering shaft for rotation therewith, an input element rotatably mounted on the steering shaft to be rotated by an actuator assembled therewith, a reaction element rotatably mounted on the steering shaft to be retained in place by a reaction mechanism assembled therewith, and an intermediate element supported by the reaction element and disposed between the output element and the input element to transmit therethrough an input torque applied from the input element to the output element, and wherein the actuator is arranged to apply the input torque to the input element when it is activated to effect automatic steering operation of the vehicle and to act as a reaction element of the input element when it is deactivated to effect manual operation of the steering wheel, while the reaction mechanism is arranged to permit free rotation of the reaction element in a condition where the actuator is deactivated and to fixedly retain the reaction element in place in a condition where the actuator is activated.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
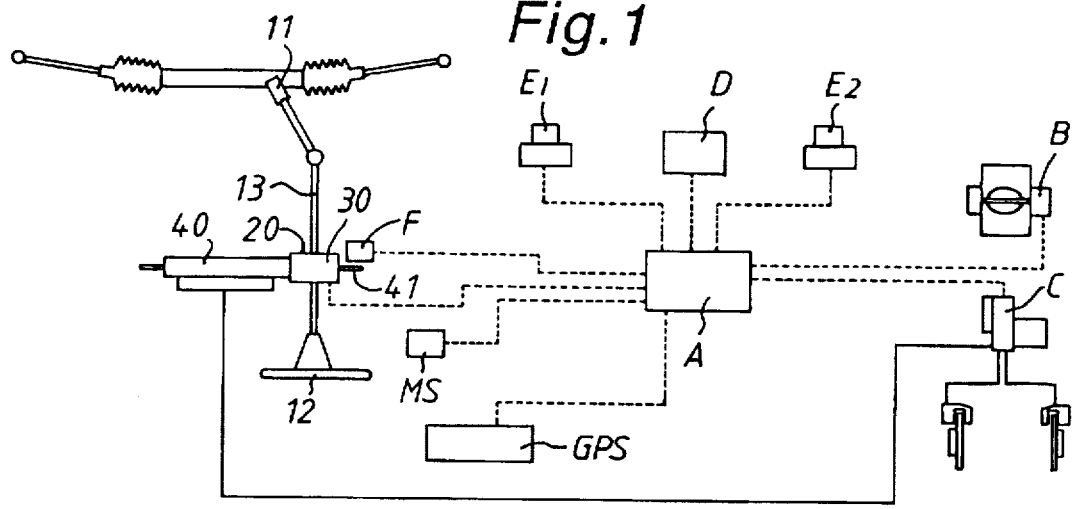
FIG. 1 is a schematic illustration of a steering apparatus in accordance with the present invention.
Figure 2:
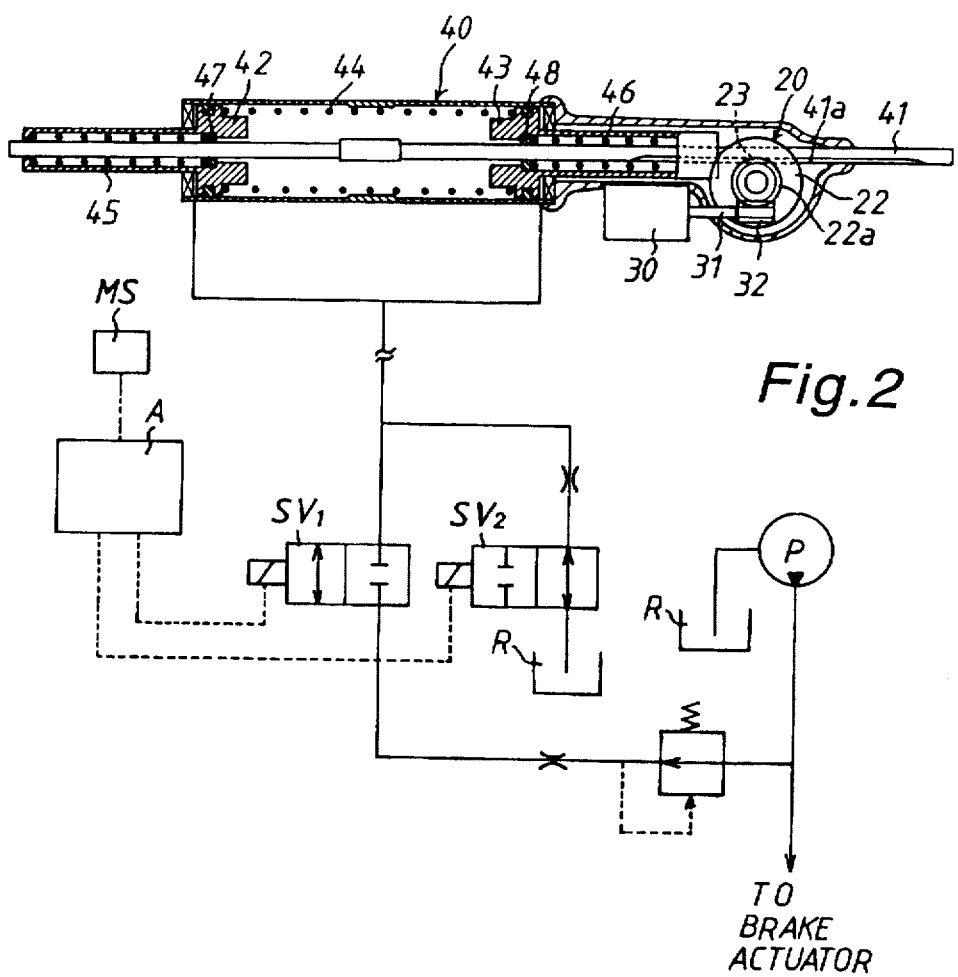
FIG. 2 is a sectional view of a hydraulic cylinder assembled with a planetary gear set shown in FIG. 1, in a condition where a pair of pistons are retained in their spaced positions.

In FIG. 1 of the drawings, there is schematically illustrated a steering apparatus for an automotive vehicle in accordance with the present invention which is capable of effecting normal steerage of the vehicle caused by manual operation of a steering wheel and of effecting automatic steerage of the vehicle for assist of the normal steerage of the vehicle. As shown in FIGS. 1 and 2, the steering apparatus includes a steering gear 11 of the rack-and-pinion types a steering shaft 13 operatively connected at its lower end to the steering gear 11 and provided at its upper end with a steering wheel 12 to be rotated by steering effort applied thereto, a planetary gear set 20 assembled with the steering shaft 13, and first and second actuators 30 and 40 respectively in the form of an electric motor and a hydraulic cylinder assembled with the planetary gear set 20. The electric motor 30 and hydraulic cylinder 40 are operated under control of an electronic controller A in the form of a microcomputer. The automotive vehicle is equipped with a well-known conventional throttle actuator B for controlling an output of a prime mover of the vehicle and a well-known conventional brake actuator C for controlling braking operation of the vehicle. The throttle actuator B and brake actuator C of the vehicle are operated under control of the electronic controller A.

The automotive vehicle is provided with a global positioning system or GPS (a navigation system for measuring a position of the vehicle with high precision by a passive range-finding method), a radar D, a pair of cameras E1, E2, a position sensor F for detecting a displacement position of a reaction rod 41 assembled within the hydraulic cylinder 40, a steering angle sensor (not shown) for detecting a steered angle of the vehicle and a manual switch MS placed adjacent a driver's seat to be switched over for selectively effecting manual and automatic steering operations. The computer A is connected to the GPS, radar D, cameras E1, E2, position sensor F, the steering angle sensor and the manual switch MS to control each operation of the electric motor 30, hydraulic cylinder 40, throttle actuator B and brake actuator C in response to electric signals applied therefrom.

Figure 3:
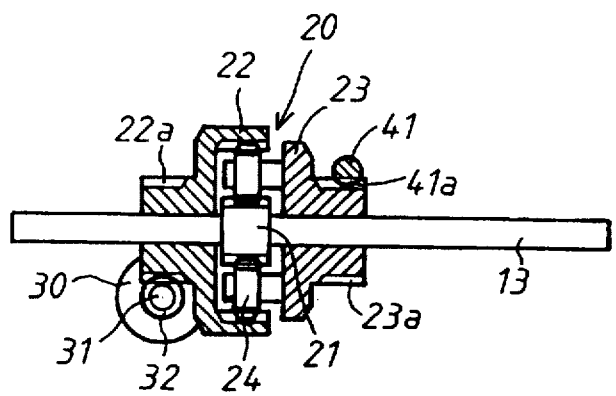
FIG. 3 is an enlarged sectional view of the planetary gear set shown in FIG. 2.

As shown in FIGS. 2 and 3, the planetary gear set 20 is composed of a sun gear 21, a ring gear 22, a carrier 23 and a set of planetary gears 24. The sun gear 21 is mounted on an intermediate portion of steering shaft 13 for rotation therewith, and the ring gear 22 is rotatably mounted on the steering shaft 13 in surrounding relationship with the sun gear 21. The ring gear 22 has a worm portion 22a meshed with a worm portion 32 formed on an output shaft 31 of the electric motor 30. The carrier 23 is rotatably mounted on the steering shaft 13. The carrier 23 is formed with a pinion 23a which is engaged with a rack portion 41a formed on the reaction rod 41 of hydraulic cylinder 40. The planetary gears 24 are rotatably supported by the carrier 23 and meshed with the sun gear 21 and ring gear 22.

The electric motor 30 is in form of a reversible electric motor with a brake which is operated under control of the computer A. The output shaft 31 of electric motor 30 acts as a reaction element of the ring gear 22 when fixedly retained in place in manual operation of the steering wheel 12 and acts as a torque input element of the ring gear 22 when rotated by activation of the electric motor 30 in automatic steering operation.

Figure 4:
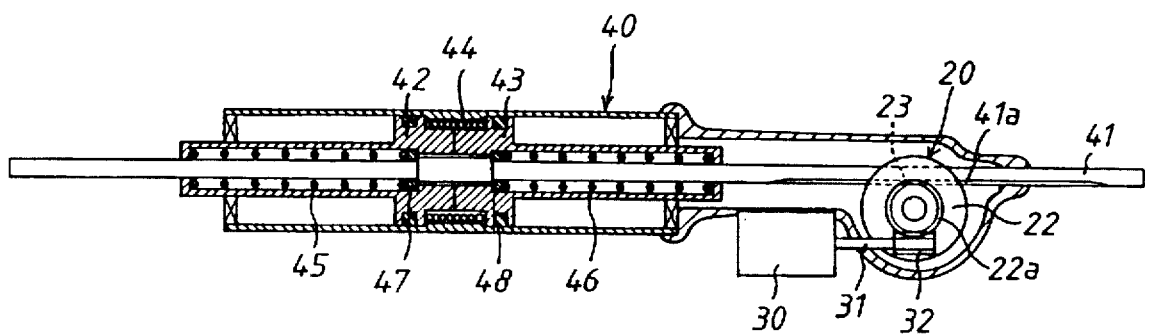
FIG. 4 is a sectional view of the hydraulic cylinder shown in FIG. 2 in a condition where the pistons are fixedly retained in a neutral position.

As shown in FIG. 2, the hydraulic cylinder 40 includes the reaction rod 41 displaceable in an axial directions a pair of axially spaced pistons 42 and 43 to be fixedly retained in a neutral position (FIG.4) when applied with fluid under pressure from a hydraulic pump P of the brake actuator C through a first solenoid valve SV1, a return spring 44 disposed between the pistons 42 and 43 to bias the pistons 42 and 43 toward their spaced positions shown in FIG. 2, and a pair of axially spaced retainer rings 47 and 48 respectively assembled within the pistons 42 and 43 and loaded by springs 45 and 48 in such a manner as to permit axial displacement of the reaction rod 41 when the pistons 42 and 43 are fixedly retained in the neutral position as shown in FIG. 4. A conduit connecting the first solenoid valve SV1 to the hydraulic cylinder 40 is bifurcated at its intermediate portion and connected to a fluid reservoir R through a second solenoid valve SV2.

Figure 5:
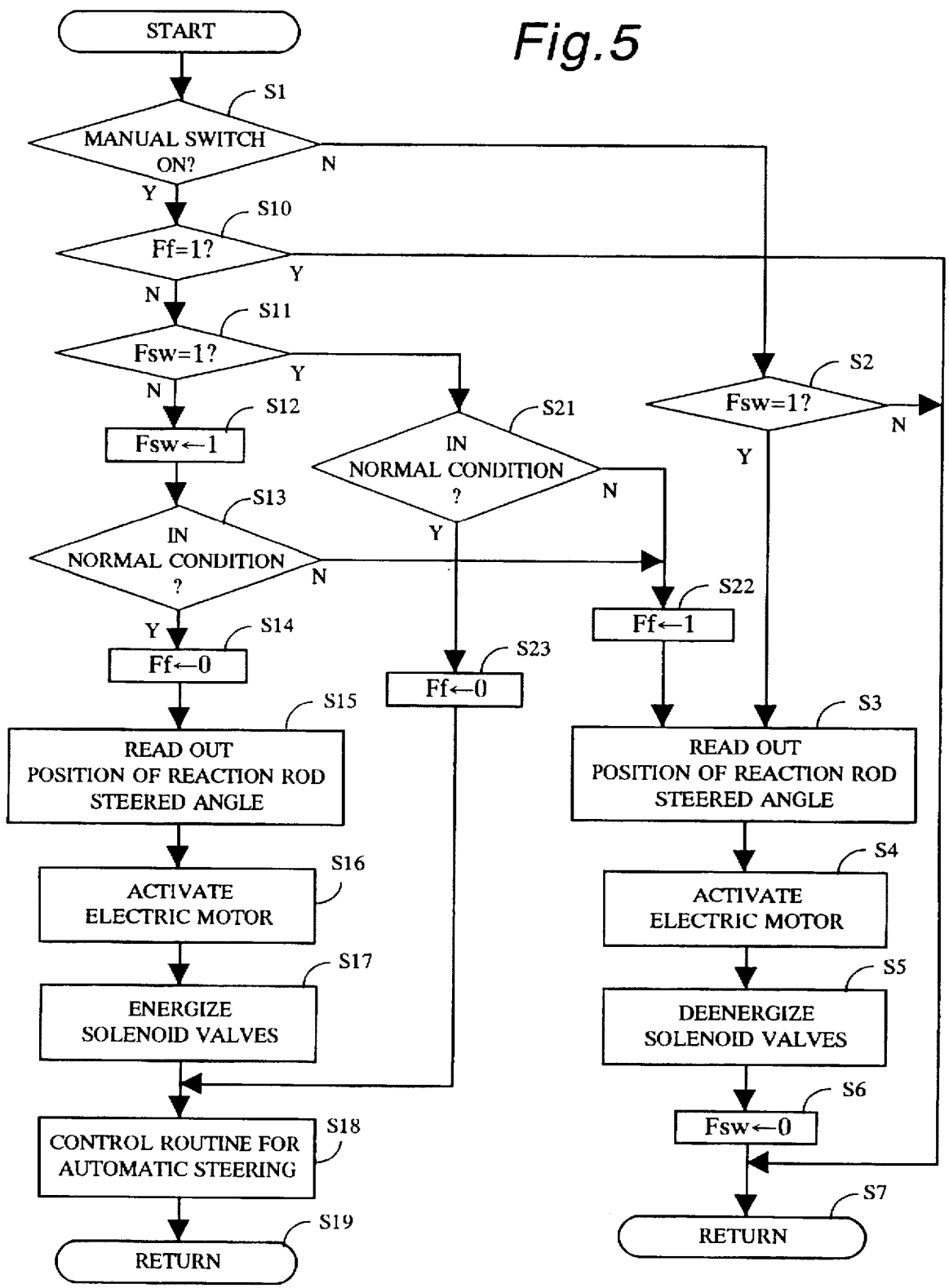
FIG. 5 is a flow chart of a control program executed by a computer shown in FIG. 1.

In this embodiments the computer A is programmed to execute a control program shown by a flow chart in FIG. 5. Assuming that the manual switch MS is maintained in a first position for effecting manual steering operation of the vehicle, the computer A determines a "No" answer at step S1 and causes the program to proceed to step S2. In turn, the computer A determines at step S2 whether a flag Fsw for automatic steering operation is "1" or not. If the answer at step S2 is "No", the computer A returns the program to step S1 at step S7. If the answer at step S2 is "Yes" the program proceeds to step S3 where the computer A reads out an actual position of the reaction rod 41 represented by an electric signal applied from the position sensor F and a steered angle of the steering wheel 12 represented by an electric signal applied from the steering angle sensor. Subsequently, the computer A activates the electric motor 30 at step S4 in response to the electric signals from the position sensor F and the steering angle sensor and deenergizes the solenoid valves SV1, SV2 at step S5. In this instances the reaction rod 41 is returned by activation of the electric motor 30 to its neutral positions while the first and second solenoid valves SV1 and SV2 are maintained in their first positions to interrupt the flow of fluid under pressure supplied from the hydraulic pump P and to permit the flow of fluid under pressure discharged from the hydraulic cylinder 40 into the fluid reservoir R. When the reaction rod 41 is returned to its neutral position, the computer A deactivates the electric motor 30 in response to the electric signal from the position sensor F. After processing at step S5, the computer A sets the flag Fsw as "0" at step S6 and returns the program to step S1 at step S7. When deactivated under control of the computer A, the electric motor 30 acts as a reaction element of the ring gear 22 of planetary gear set 20. In such a condition, the pistons 42 and 43 of hydraulic cylinder 40 are retained at their spaced positions under the load of return spring 44 as shown in FIG. 2 to permit axial displacement of the reaction rod 41 and to permit free rotation of the carrier 23. Thus, the steering shaft 13 can be freely rotated by steering effort applied to the steering wheel 12.

When the manual switch MS is switched over to a second position for effecting automatic steering operation of the vehicle, the computer A determines a "Yes" answer at step S1 and causes the program to proceed to step S10. In turn, the computer A determines at step S10 whether a flag Ff for prohibition of automatic steering operation is "1" or not. If the answer at step S10 is "Yes", the computer A returns the program to step S1 at step S7. If the answer at step S10 is "No", the program proceeds to step S11 where the computer A determines whether the flag Fsw is "1" or not. If the answer at step S11 is "Yes", the computer A determines at step S21 whether the electric control system of the steering apparatus is in a normal condition or not. If the control system fails to control the electric motor 30 in operation, the computer A determines a "No" answer at step S21 and causes the program to proceed to step S22. In turn, the computer A sets the flag Ff as "1" and executes processing at step S3 to S6 in the same manner as described above. In such an instance, the electric motor 30 is maintained in its deactivated condition and acts as a reaction element of the ring gear 22 while the reaction rod 41 is placed in its neutral position to be movable in the axial direction. Thus, the steering shaft 13 can be freely rotated by steering effort applied to the steering wheel. If the answer at step S 21 is "Yes", the computer A sets the flag Ff as "0" at step S23 and causes the program to proceed to step S18 for processing of a control routine for automatic steering. After processing at step S18, the computer A returns the program to step S1 at step S19.

If the answer at step S11 is "No", the computer A sets the flag Fsw as "1" at step S12 and determines at step S13 whether the control system of the steering apparatus is in a normal condition or not. If the answer at step S13 is "No", the computer A causes the program to proceed to step S22. In turn, the computer A sets the flag Ff as "1" at step S22 and executes processing at steps S3 to S6 in the same manner as described above. In such an instance, the electric motor 30 is maintained in its deactivated condition and acts as a reaction element of the ring gear 22, while the reaction rod 41 of hydraulic cylinder 40 is placed in its neutral position to be movable in the axial direction. Thus, the steering shaft 13 can be freely rotated by steering effort applied to the steering wheel 12. If the answer at step S13 is "Yes", the computer A sets the flag Ff as "0" at step S14, reads out at step S15 an actual position of the reaction rod 41 represented by the electric signal applied from the position sensor F and a steered angle of the steering shaft 13 represented by the electric signal applied from the steering angle sensor, and activates at step S16 the electric motor 30 in response to the electric signals from the position sensor F and the steering angle sensor so that the reaction rod 41 is displaced to a position defined by the steered angle of the steering shaft 13. After processing at step S16, the computer A energizes the solenoid valves SV1 and SV2 at step S17, executes processing of the control routine for automatic steering at step S18 and returns the program to step S1 at step S19. In such an instance, the first and second solenoid valves SV1 and SV2 are switched over to their second positions to supply the fluid under pressure from the hydraulic pump P into the hydraulic actuator 40 and to interrupt the flow of fluid discharged into the fluid reservoir R. Thus the pistons 42 and 43 of hydraulic cylinder 40 are axially inwardly moved by the fluid under pressure against the load of return spring 44 and retained in the neutral position to restrict axial displacement of the reaction rod 41 as shown in FIG. 4. In such a condition, the carrier 23 is fixedly retained in place by engagement with the rack portion of reaction rod 41, while the electric motor 30 is activated under control of the computer A to rotate the ring gear 22 of planetary gear set 20. This causes the sun gear 21 to rotate for effecting automatic steering operation of the vehicle.

When the manual switch MS is switched over from the second position to the first position for effecting manual operation of the steering wheel 12, the computer A determines a "No" answer at step S1 and executes processing at step S2–S6 in the same manner as described above. In this instances, the solenoid valves SV1 and SV2 are maintained in their first positions to permit the fluid under pressure discharged from the hydraulic cylinder 40 into the fluid reservoir R and to interrupt the flow of fluid under pressure supplied from the hydraulic pump P. Thus, the pistons 42, 43 are returned to their spaced positions under the load of return spring 44, while the electric motor 30 is activated under control of the computer A in response to the electric signals from the position sensor F and the steering angle sensor so that the reaction rod 41 is returned to a position defined by the steered angle of the steering shaft 13.

If the electric control system of the steering apparatus fails to control the electric motor 30 in operation during the automatic steering operations the output shaft 31 of electric motor 30 is fixedly retained in place and acts as a reaction element of the ring gear 22, while the solenoid valves SV1 and SV2 are deenergized to discharge the fluid under pressure from the hydraulic cylinder 40 so that the pistons 42 and 43 are returned to their spaced positions under the load of return spring 44 to permit axial displacement of the reaction rod 41 and to permit free rotation of the carrier 23. As a result, the vehicle can be steered by manual operation of the steering wheel 12 in a usual manner without causing any difference in rotation phase between the steering wheel 12 and the steering shaft 13. During such manual operation of the steering wheel 12, the driver is applied with a reaction force from road surfaces through the steering shaft 13.

Since the electric motor 30 and the solenoid valves SV1, SV2 are deactivated in the manual steering operation of the vehicle, the electric control system of the electric motor 30 and hydraulic cylinder 40 can be simplified in construction to provide the steering apparatus at a low cost.

When the manual switch MS is switched over from the second position to the first position during the automatic steering operation, the pistons 42 and 43 are returned to their spaced positions under the load of return spring 44 in accordance with discharge of the fluid under pressure from the hydraulic cylinder 40 to gradually increase an extent for permitting axial displacement of the reaction rod 41. This is useful to eliminate a sudden change in axial displacement of the reaction rod 41 caused by a reaction force applied from road surfaces thereby to stabilize manual operation of the steering wheel.

In the steering apparatus, it is to be noted that the springs 45 and 46 are assembled within the pistons 42 and 43 to permit axial displacement of the reaction rod 41 in a condition where the pistons 42 and 43 are fixedly retained in the neutral position during the automatic steering operation of the vehicle. With such an arrangement of the springs 45 and 46, the reaction rod 41 is displaced against either one of the springs 45 and 46 when the steering wheel 12 is operated by the driver during the automatic steering operation of the vehicle. As a result, the automatic steering operation of the vehicle is assisted by manual operation of the steering wheel 12. This means that the automatic steering operation can be adjusted by the driver's intent.

What is claimed is:

1. A steering apparatus for an automotive vehicle having a steering shaft directly connected at one end thereof with a steering gear and provided at the other end thereof with a steering wheel to be rotated by steering effort applied thereto and a planetary gear set assembled with said steering shaft, wherein said planetary gear set comprises an output element mounted on said steering shaft for rotation therewith, an input element rotatably mounted on said steering shaft to be rotated by an actuator assembled therewith, a reaction element rotatably mounted on said steering shaft to be retained in place by a reaction mechanism assembled therewith, and an intermediate element supported by said reaction element and disposed between said output element and said input element to transmit there through input torque applied from said input element to said output element, and wherein said actuator is arranged to apply the input torque to said input element when it is activated to effect automatic steering operation of the vehicle and to act as a reaction element of said input element when it is deactivated to effect manual operation of said steering wheel, while said reaction mechanism is arranged to permit free rotation of said reaction element in a condition where said actuator is being deactivated and to retain said reaction element in place in a condition where said actuator is being activated.

2. A steering apparatus as recited in claim 1, wherein said output element is a sun gear, said input element is a ring gear, said reaction element is a carrier, and said intermediate element is a set of planetary gears rotatably supported by said carrier and in mesh with said sun gear and said ring gear.

3. A steering apparatus for an automotive vehicle having a steering shaft connected at one end thereof with a steering gear and provided at the other end thereof with a steering wheel to be rotated by steering effort applied thereto and a planetary gear set assembled with said steering shaft, wherein said planetary gear set comprises an output element mounted on said steering shaft for rotation therewith, an input element rotatable mounted on said steering shaft to be rotated by an actuator assembled therewith, a reaction element rotatable mounted on said steering shaft to be retained in place by a reaction mechanism assembled therewith, and an intermediate element supported by said reaction element and disposed between said output element and said input element to transmit therethrough input torque applied from said input element to said output element, wherein said actuator is arranged to apply the input torque to said input element when it is activated to effect automatic steering operation of the vehicle and to act as a reaction element of said input element when it is deactivated to effect manual operation of said steering wheel, while said reaction mechanism is arranged to permit free rotation of said reaction element in a condition where said actuator is being deactivated and to retain said reaction element in place in a condition where said actuator is being activated, and wherein said reaction mechanism comprises a hydraulic cylinder including a pair of axially spaced pistons to be retained in a neutral position when applied with fluid under pressure in automatic steering operation and a return spring disposed between said pistons to retain said pistons at their spaced positions in manual steering operation, and a reaction rod operatively connected to said reaction element and assembled within said hydraulic cylinder to be movable in an axial direction when said pistons are retained as their spaced positions under the load of said return spring and to be retained in place when said pistons are retained in the neutral position.

4. A steering apparatus as recited in claim 3, wherein said hydraulic cylinder includes a pair of springs respectively assembled within said pistons to permit axial displacement of said reaction rod in a condition where said pistons are retained in the neutral position.

5. A steering apparatus as recited in claim 3, wherein an electric control system for said steering apparatus includes means for activating said electric motor to return said reaction rod to a neutral position when said pistons are retained in the neutral position.

6. A steering apparatus as recited in claim 3, wherein said actuator is in the form of an electric motor the output shaft of which is operatively connected to said input element.

7. A steering apparatus for an automotive vehicle having a steering shaft directly connected at one end thereof with a steering gear and provided at the other end thereof with a steering wheel to be rotated by steering effort applied thereto and a planetary gear set assembled with said steering shaft, wherein said planetary gear set comprises:
  a ring gear;
  a sun gear;
  a carrier; and
  a set of planetary gears rotatably supported by said carrier;

wherein one of said ring gear, said sun gear and said carrier is mounted as an output element on said steering shaft for rotation therewith, another of said ring gear, said sun gear and said carrier is rotatably mounted as an input element on said steering shaft to be rotated by an actuator assembled therewith, and the other of said ring gear, said sun gear and said carrier is rotatably mounted as a reaction element on said steering shaft to be retained in place by a reaction mechanism assembled therewith; and wherein said actuator is arranged to apply input torque to said input element when it is activated to effect automatic steering operation of the vehicle and to apply a reaction force to said input element when it is deactivated to effect manual operation of said steering wheel, while said reaction mechanism is arranged to permit free rotation of said reaction element in a condition where said actuator is being deactivated and to retain said reaction element in place in a condition where said actuator is being activated.

8. A steering apparatus as recited in claim 7, wherein said reaction mechanism comprises a hydraulic cylinder including a pair of axially spaced pistons to be retained in a neutral position when applied with fluid under pressure in automatic steering operation and a return spring disposed between said pistons to retain said pistons at their spaced positions in manual steering operation, and a reaction rod operatively connected to said reaction element and assembled within said hydraulic cylinder to be movable in an axial direction when said pistons are retained at their spaced positions under the load to said return spring and to be retained in place when said pistons are retained in the neutral position.

9. A steering apparatus for an automotive vehicle having a steering shaft directly connected at one end thereof with a steering gear and provided at the other end thereof with a steering wheel to be rotated by steering effort applied thereto and a planetary gear set assembled with said steering shaft, wherein said planetary gear set comprises an output element mounted on said steering shaft for rotation therewith, an input element rotatably mounted on said steering shaft to be rotated by an actuator assembled therewith, a reaction element rotatably mounted on said steering shaft to be retained in place by a reaction mechanism assembled therewith, and an intermediate element disposed between said output element and said input element to transmit there through input torque applied from said input element to said output element, and wherein said actuator is arranged to apply the input torque to said input element when it is activated to effect automatic steering operation of the vehicle and to apply a reaction force to said input element when it is deactivated to effect manual operation of said steering wheel, while said reaction mechanism is arranged to permit free rotation of said reaction element in a condition where said actuator is being deactivated and to retain said reaction element in place in a condition where said actuator is being activated.

10. A steering apparatus as recited in claim 9, wherein said reaction mechanism comprises a hydraulic cylinder including a pair of axially spaced pistons to be retained in a neutral position when applied with fluid under pressure in automatic steering operation and a return spring disposed between said pistons to retain said pistons at their spaced positions in manual steering operation, and a reaction rod operatively connected to said reaction element and assembled within said hydraulic cylinder to be movable in an axial direction when said pistons are retained at their spaced positions under the load of said return spring and to be retained in place when said pistons are retained in the neutral position.

* * * * *